(12) United States Patent
Lindholm et al.

(10) Patent No.: US 11,621,888 B2
(45) Date of Patent: Apr. 4, 2023

(54) TECHNIQUES FOR MIGRATING WORKER NODES TO A NEW MANAGER INSTANCE

(71) Applicant: Oracle International Corporation, Redwood Shores, CA (US)

(72) Inventors: Jacob M. Lindholm, Londonderry, NH (US); Aseem Bajaj, Pleasanton, CA (US); Andrew James Pryde, Bristol (GB); Joshua Aaron Horwitz, Centreville, VA (US); David Sang-Chul Nahm, Los Altos Hills, CA (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 0 days.

(21) Appl. No.: 17/929,096

(22) Filed: Sep. 1, 2022

(65) Prior Publication Data

US 2022/0417093 A1    Dec. 29, 2022

Related U.S. Application Data

(63) Continuation of application No. 17/456,069, filed on Nov. 22, 2021, now Pat. No. 11,469,944.
(Continued)

(51) Int. Cl.
*G06F 9/54* (2006.01)
*G06F 11/07* (2006.01)
(Continued)

(52) U.S. Cl.
CPC ...... *H04L 41/0813* (2013.01); *H04L 61/5007* (2022.05); *H04L 61/5076* (2022.05); *H04L 67/1001* (2022.05)

(58) Field of Classification Search
CPC ............ H04L 41/0813; H04L 61/5007; H04L 61/5076; H04L 67/1001
See application file for complete search history.

(56) References Cited

U.S. PATENT DOCUMENTS 6,026,401 A * 2/2000 Brealey ............... G06F 9/52
9,507,579 B2   11/2016 Gambardella et al.
(Continued)

OTHER PUBLICATIONS

"Production-Grade Container Orchestration", Kubernetes, retrieved Nov. 29, 2021 from https://kubernetes.io/#features, 7 pages.
(Continued)

*Primary Examiner* — Christopher B Robinson
(74) *Attorney, Agent, or Firm* — Kilpatrick Townsend & Stockton LLP

(57) ABSTRACT

Techniques for migrating worker nodes within clusters to a new manager instance. One technique includes receiving a request to migrate or update a configuration of a cluster within a container system, where the migration or update includes switching from a first communication pathway to a second communication pathway between worker nodes and a manager instance; creating a component and associated IP address for the second communication pathway; communicating a pod specification that includes the IP address for the second communication pathway to the manager instance, where the pod specification will cause a container tool to update each of the worker nodes with the IP address for the second communication pathway; receiving a notification that all worker nodes have been updated with the IP address; and removing a component and associated IP address for the first communication pathway from the cluster.

20 Claims, 10 Drawing Sheets

Related U.S. Application Data

(60) Provisional application No. 63/210,391, filed on Jun. 14, 2021.

(51) Int. Cl.
*H04L 29/06* (2006.01)
*H04L 29/08* (2006.01)
*H04L 29/14* (2006.01)
*H04L 41/0813* (2022.01)
*H04L 61/5007* (2022.01)
*H04L 61/5076* (2022.01)
*H04L 67/1001* (2022.01)

(56) References Cited

U.S. PATENT DOCUMENTS

| | | | |
|---|---|---|---|
| 9,804,901 B2 | 10/2017 | Gambardella et al. | |
| 10,346,216 B1 | 7/2019 | Yang et al. | |
| 10,924,535 B2 | 2/2021 | Du et al. | |
| 11,169,727 B1 | 11/2021 | Doucette et al. | |
| 11,469,944 B1 | 10/2022 | Lindholm et al. | |
| 2009/0276771 A1* | 11/2009 | Nickolov | H04L 67/1008 718/1 |
| 2014/0047227 A1* | 2/2014 | Breternitz | G06F 9/5066 713/2 |
| 2014/0047341 A1* | 2/2014 | Breternitz | G06F 16/23 715/735 |
| 2017/0163762 A1* | 6/2017 | Nguyen | H04L 41/0681 |
| 2020/0153898 A1* | 5/2020 | Sabath | G06F 9/4856 |
| 2020/0280592 A1 | 9/2020 | Ithal et al. | |
| 2021/0409349 A1 | 12/2021 | Grunwald et al. | |

OTHER PUBLICATIONS

U.S. Appl. No. 17/456,069, "Notice of Allowance", dated Jun. 2, 2022, 12 pages.

* cited by examiner

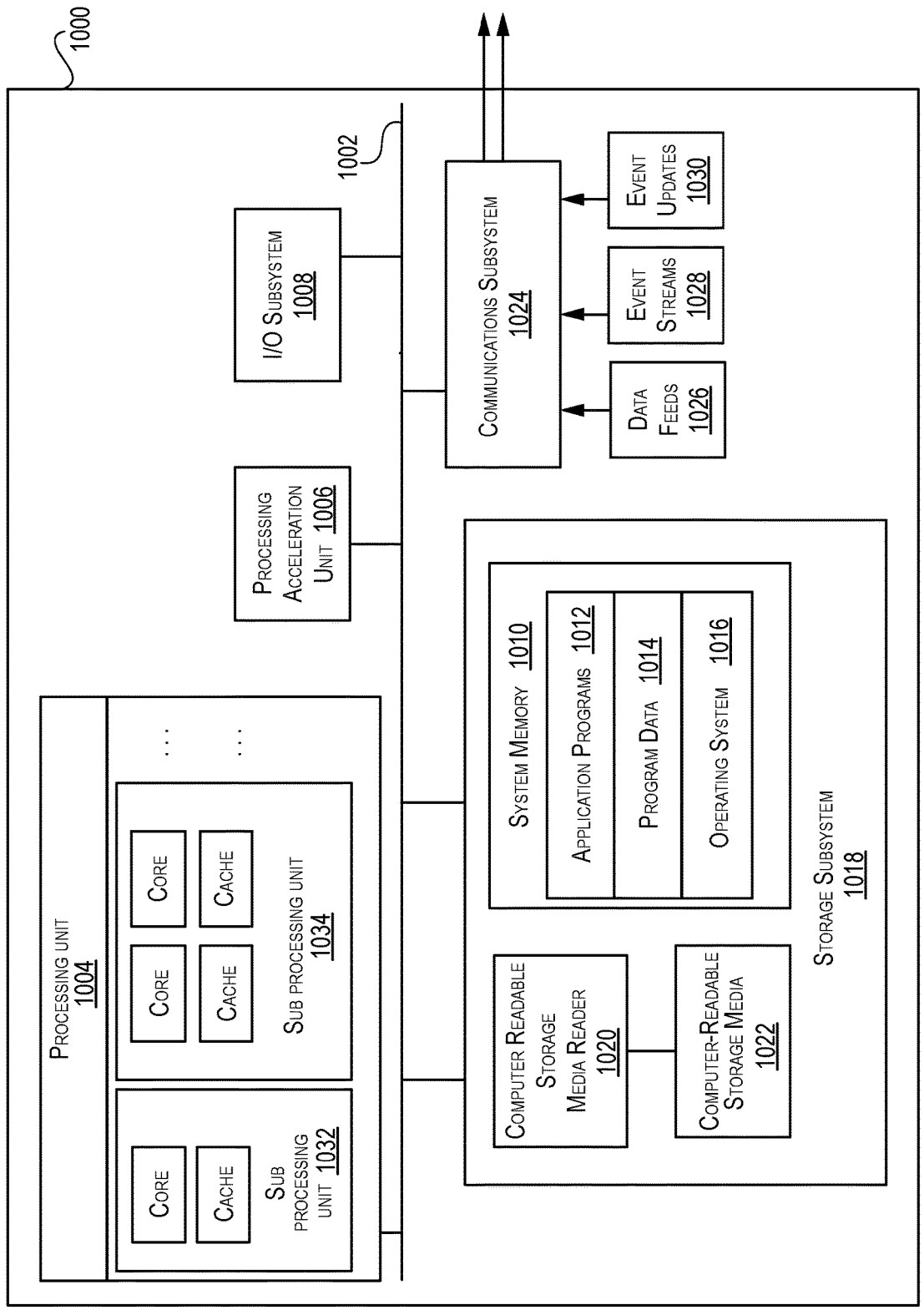

TECHNIQUES FOR MIGRATING WORKER NODES TO A NEW MANAGER INSTANCE

CROSS REFERENCE TO RELATED APPLICATIONS

This application is a continuation of U.S. patent application Ser. No. 17/456,069, filed Nov. 22, 2021, which claims priority to U.S. Provisional Application No. 63/210,391, filed on Jun. 14, 2021, which are herein incorporated by reference in their entireties for all purposes.

FIELD

The present disclosure relates generally to managing containerized workloads and services in a virtual cloud network, and more particularly, to techniques for migrating worker nodes within clusters to a new manager instance by switching network communications between the worker nodes and various components within a virtual cloud network.

BACKGROUND

Cloud computing providers may manage many compute instances on behalf of a variety of users. For example, the Oracle Cloud Infrastructure Container Engine for Kubernetes is a fully-managed, scalable, and highly available service that can be used to deploy containerized applications to the cloud. The Container Engine for Kubernetes (OKE) can be used by a development team to build, deploy, and manage cloud-native applications. For example, the development team can specify the compute resources that applications require, and the OKE provisions the compute resources on the Oracle Cloud Infrastructure (OCI) in an existing OCI tenancy. The OKE uses Kubernetes to provision and manage the compute resources. Kubernetes is an open-source system for automating deployment, scaling, and management of containerized applications across clusters of hosts. Kubernetes groups the containers that make up an application into logical units (called pods) for easy management and discovery. Once the containerized applications are deployed on the cloud across clusters, the development team can use the OKE to monitor and modify properties of the existing clusters such as changing the name of clusters, the number of node pools in a cluster, a version Kubernetes to run on the control plane, and enforcement of security policies.

BRIEF SUMMARY

Techniques are provided (e.g., a method, a system, non-transitory computer-readable medium storing code or instructions executable by one or more processors) for migrating worker nodes within clusters to a new manager instance by switching network communications between the worker nodes and various components within a virtual cloud network.

In various embodiments, a computer implemented method is provided that comprises: receiving, at a computing system, a request to migrate or update a configuration of a cluster within a container system, where the migration or update comprises switching from a first communication pathway to a second communication pathway between worker nodes and a manager instance; creating, by the computing system, one or more components and associated IP address(es) for the second communication pathway within the cluster; generating, by the computing system, a pod specification that includes the IP address(es) for the second communication pathway and IP address(es) for the first communication pathway; communicating, by the computing system, the pod specification to the manager instance, where the pod specification will cause an application programming interface (API) server associated with the cluster to restart with the IP address(es) for the second communication pathway and the IP address(es) for the first communication pathway, and where the restart of the API server will cause a container tool deployed on each of the worker nodes to update each of the worker nodes with the IP address(es) for the second communication pathway; receiving, by the computing system, a notification that all worker nodes have been updated with the IP address(es) for the second communication pathway; and removing, by the computing system, one or more components and associated IP address(es) for the first communication pathway from the cluster.

In some embodiments, the updating each of the worker nodes comprises iteratively: acquiring, by the container tool, a locking mechanism for a worker node, confirming, by the container tool, connectivity from the worker node to the one or more components and associated IP address(es) for the second communication pathway, updating, by the container tool, a configuration file of the worker node to point to the associated IP address(es) for the second communication pathway, and releasing, by the container tool, the locking mechanism.

In some embodiments, the updating each of the worker nodes further comprises iteratively: updating, by the container tool, a configuration file of the container tool, restarting the container tool after updating the configuration file of the container tool and prior to updating the configuration file of the worker node, and clearing a 'needs-migration' label from the worker node after updating the configuration file of the worker node.

In some embodiments, the notification is received based on clearing the 'needs-migration' label from all the worker nodes.

In some embodiments, the method further comprises: updating, by the computing system, a cluster state of the cluster to include the IP address(es) for the second communication pathway; and generating, by the computing system based on the cluster state update, certificates that include the IP address(es) for the second communication pathway and IP address(es) for the first communication pathway, wherein the pod specification is generated based on the certificates.

In some embodiments, the one or more components for the second communication path comprise a service or software defined virtual network interface card and the one or more components for the first communication pathway comprise a load balancer.

In some embodiments, the method further comprises in response to receiving the notification that all worker nodes have been updated, scheduling, by the computing system, reclamation of the one or more components and the associated IP address(es) for the first communication pathway at a predetermine time in the future, wherein the one or more components and associated IP address(es) for the first communication pathway are removed from the cluster in accordance with the scheduling of reclamation at the predetermine time in the future.

Some embodiments of the present disclosure include a system including one or more data processors. In some embodiments, the system includes a non-transitory computer readable storage medium containing instructions which, when executed on the one or more data processors, cause the one or more data processors to perform part or all of one or more methods and/or part or all of one or more processes disclosed herein.

Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

Various embodiments in accordance with the present disclosure will be described with reference to the drawings, in which:

FIG. 10 is a block diagram illustrating an example computer system, according to at least one embodiment.

DETAILED DESCRIPTION

Figure 1:
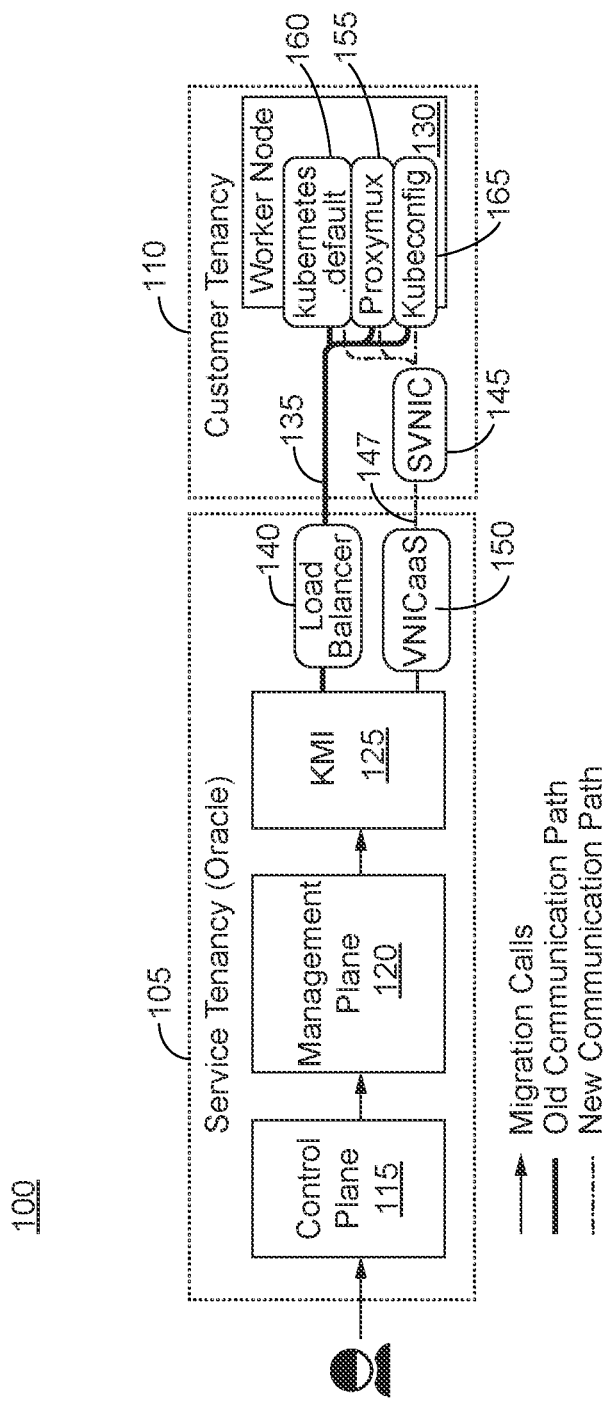
FIG. 1 illustrates an example environment for migrating or updating a cluster configuration according to various embodiments.

In the following description, for the purposes of explanation, specific details are set forth in order to provide a thorough understanding of certain embodiments. However, it will be apparent that various embodiments may be practiced without these specific details. Furthermore, well-known features may be omitted or simplified in order not to obscure the embodiment being described. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Introduction

In a virtual cloud network, the migration or update of clusters from one type of cluster configuration to another type of cluster configuration typically involves switching the network communication between components (e.g., between the clusters' manager instance and worker nodes). For example, the migration or update of clusters from a configuration of V1Hardened (hardened clusters with worker nodes on a customer's tenancy connected via a load balancer to a manager instance on a service tenancy) to configuration of V2 Native VCN Clusters (clusters with worker nodes on a customer's tenancy connected via service or software defined virtual network interface cards (SVNIC) to a manager instance on a service tenancy) may involve switching the network communication between the cluster's Kubernetes manager instance (KMI) and its worker nodes off of the Load Balancer and onto a new SVNIC. The SVNIC may be created in the customer's tenancy and attached to the customer specified subnet, and may be connected to the KMI on the service tenancy by a microVNIC. Communication between the KMI and the worker nodes may be on private Internet Protocol (IP) addresses through the SVNIC, but the SVNIC may support a public IP address that the customer can optionally request and use. The result of this exemplary migration would be increased security and improved resource utilization.

However, it is difficult for service providers to implement a migration or update (e.g., migrating from an initial version of a KMI to a subsequent version of a KMI) seamlessly on a preexisting container system such as Kubernetes without disrupting the customer's services. In many instances (e.g., an Infrastructure-as-a-Service (IaaS) system or any cloud computing service), the various components of the preexisting container system such as Kubernetes are deployed across multiple tenancies, for example, the service provider's tenancy and the customer's tenancy. As used herein, multi-tenancy means that a single instance of the software and its supporting infrastructure serves multiple tenants. Each tenant shares software applications and may also share real and virtual hardware such as managers, databases, etc. Each tenant's data is isolated and remains invisible to other tenants (even the service provider tenancy). Thus, the cloud service provider typically does not have direct access to components of the container system (e.g., worker nodes) within the customer tenancy, which creates a problem when the service provider migrates or updates components within their tenancy that affect components within the customer tenancy. The service provider needs an approach to implement a migration or update of the various components within the container system (including those within the customer tenancy) without direct access and without disrupting the customer's services.

To overcome these challenges and others, various embodiments are directed to techniques for migrating or updating of clusters from one type of cluster configuration to another type of cluster configuration. The techniques described in detail herein pertain to modifying and using existing components of the container system (e.g., a container tool such as a DaemonSet) and the virtual cloud network (e.g., connectivity between the service tenancy and the client tenancy via the container tool and container engine) to disconnect and connect various components of the container system in order to migrate or update configurations. In an exemplary embodiment, a technique implemented by a computing system for the migration or update of clusters from a first type of cluster configuration to a second type of cluster configuration includes: receiving, at a computing system, a request to migrate or update a configuration of a cluster within a container system, where the migration or update comprises switching from a first communication pathway to a second communication pathway between worker nodes and a manager instance; creating, by the computing system, one or more components and associated IP address(es) for the second communication pathway within the cluster; generating, by the computing system, a pod specification that includes the IP address(es) for the second communication pathway and IP address(es) for the first communication pathway; communicating, by the computing system, the pod specification to the manager instance, where the pod specification will cause an application programming interface (API) server associated with the cluster to restart with the IP address(es) for the second communication pathway and the IP address(es) for the first communication pathway, and where the restart of the API server will cause a container tool deployed on each of the worker nodes to update each of the worker nodes with the IP address(es) for the second communication pathway; receiving, by the computing system, a notification that all worker nodes have been updated with the IP address(es) for the second communication pathway; and removing, by the computing system, one or more components and associated IP address(es) for the first communication pathway from the cluster.

Computing System For Migrating or Updating Cluster Components

FIG. 1 is a block diagram illustrating a computing environment 100 for migrating worker nodes within clusters to a new manager instance by switching network communications between the worker nodes and various components within a virtual cloud network. However, it should be understood that a similar computing environment can be implemented for migrating or updating clusters from any type of cluster configuration to any other type of cluster configuration. Especially those cluster configurations where various components of the preexisting container system are deployed across multiple tenancies. As shown in FIG. 1, the computing environment 100 includes a service tenancy 105 (e.g., a service provider's tenancy such as the OKE) and a customer tenancy 110. The service tenancy 105 includes a control plane 115, a management plane 120, and a KMI 125. The customer tenancy 110 includes worker nodes 130.

The control plane 115 is the part of the software that configures and controls a data plane including the management plane 120 and the KMI 125. For example, the control plane 115 may be used for adding, updating, and removing components (e.g., in terms of a container system—creation of nodes, managers, and policies governing users access) on the data plane. The management plane 120 is the part of the software that processes the data requests (e.g., implements migrations, updates, business logic, etc.). For example, the management plane 125 takes the nodes, managers, and policies, and implements migration, updates, business logic, etc. on top of them (e.g., updating manager instances). The KMI 125 is one or more manager instances which run the container system control plane (e.g., the Kubernetes control plane) components for a dedicated cluster. Each cluster may have multiple KMIs 125, which provide high availability. A cluster comprises a set of worker machines, called worker nodes 130, that run containerized applications. Every cluster has at least one worker node 130. With respect specifically to Kubernetes, the worker node(s) 130 host Pods that are the components of the application workload. A Pod is a Kubernetes abstraction that represents a group of one or more application containers (such as Docker), and some shared resources for those containers. Those resources may include: shared storage, as volumes, networking, as a unique cluster IP address, and information about how to run each container, such as the container image version or specific ports to use. The Kubernetes control plane manages the worker nodes 130 and the Pods in the cluster. In production environments, the Kubernetes control plane usually runs across multiple computers or virtual machines and a cluster usually runs multiple worker nodes 130, providing fault-tolerance and high availability.

As illustrated in FIG. 1, in a first cluster configuration (herein called V1 or V1Hardened) the worker nodes 130 are connected to the KMI 125 via an old version communication path 135 that includes load balancers 140 residing on the service tenancy 105. The service provider is interested migrating or updating the cluster to a second cluster configuration (herein called V2 or V2 Native VCN Clusters) in order to get communication between the worker nodes 130 and the KMI 125 off of the load balancers 140 in the service tenancy 105, and on to SVNICs 145 in the customer tenancy 110 via an new version communication path 147. In or order to implement this migration or update, the customer initiates a V2 migration by making an API call to the control plane 115 and passing in the required information, including the ID of the customer's subnet where the SVNIC 145 should be attached, and whether the customer would like a public IP address to be created and attached to the SVNIC 145 as well, and the ID of network security groups the customer would like applied. The control plane 115 will add a V2 migration request that the V2 migration nanny will pick up and use to spawn a V2 migration workflow (discussed in detail herein). The control plane 115V2 migration workflow will validate the input and the cluster state, create the SVNIC 145 and optional public IP, and attach the SVNIC 145. Up until this point, if there is a failure, the cluster can still be rolled back to the original state, but starting with the next step, there may be no rollback. The next step is for control plane 115 to update the cluster state in a messaging application programming interface (MAPI), using the private IP address of the new SVNIC 145 as the advertise address, and including the existing load balancer 140 public IP and the optional SVNIC public IP in the additional addresses. After the control plane 115 confirms that the management plane 120 was able to reconcile the change, the control plane 115 will delete the old SVNIC from the customer tenancy 110 that each V1H cluster uses to communicate to OCI Services via the KMI 125. In V2 clusters, KMI's 125 communicate to OCI Services via a service gateway configured in the customers network.

When the control plane 115, updates the state of the cluster by calling MAPI, the management plane 120 may reconcile the change and take several actions including attaching a new muNIC or microVNIC 150 associated with the new SVNIC 145. The detailed flow may be as follows: the management plane 120 MP3 may generate new certificates for the KMI's 125 that include both the load balancer 140 public IP address and the SVNIC's 145 address(es). So the customer can continue to reach the kube-api-server using either the old or the new addresses. The Proxymux server will also get a new certificate that includes the load balancer 140 public IP address and the SVNIC's 145 address(es). The management plane 120 will create a new pod spec, and push it to the KMIs 125. All of the containers will be restarted, kubet-api-server will restart with the new advertised address(es). The control plane 115 will poll for this reconciliation to be complete, and if it completes successfully, will consider the migration workflow to have completed successfully, and will update the V2 Migration Complete timestamp for the cluster to the current time.

In the meantime, on each of the worker nodes 130 in the cluster, a proxymux client 155 resides that will be watching for changes in endpoint of the kubernetes.default 160 service that will be triggered by the kube-api-server restarting with the new advertise address(es). When proxymux client 155 sees this value change, it will start its migration sequence, but only after it sees that the advertise address(es) has settled down to a single address. As the kube-api-servers are restarting at different times, there will be a time when different kube-api-servers are advertising different addresses. Proxymux client 155 will wait for this to quiesce back to a single address before proceeding.

The proxymux client 155 migration sequence will be comprised of acquiring a configmap lock, so that only one worker node 130 in the cluster will attempt the migration at a time. Proxymux client 155 will confirm that connectivity (e.g., tcp connectivity) to the new address is working properly. If it is, proxymux client 155 will change the proxymux server address in its config and restart. Proxymux client 155 will then update the worker node's 130 kubeconfig 165 (/etc/kubernetes/kubelet.conf) to point to the server at the new address. The kubelet service definition in systemd will also need to be updated so that pods don't get restarted when kubelet is restarted.

If the proxymux client 155 is not able to verify connectivity via the new address, the proxymux client 155 will halt the migration and the needsMigration label will not get updated. This will indicate that the migration was blocked by a network connectivity error. This error may be the result of customer misconfiguration of the network, and may be remediated by the customer. The proxymux client 155 will continue to periodically test the connectivity, so after the customer has fixed the network configuration, the proxymux client migration will resume automatically. After the proxymux client 155 has successfully migrated a worker node 130 to use the new IP address, the proxymux client 155 will clear the 'needs-migration' label from the worker node 130. It will wait a predetermined amount of time (e.g., 40 seconds) before releasing the lease. This will allow proxymux clients 155 running on other worker nodes 130 to attempt migration on their worker nodes 130.

At this point, all OKE/Kubernetes communication will be configured to use the private IP address of the SVNIC 145, and it will be up to the customer to update all of their references from the old load balancer's 140 public IP address to the new SVNIC address. This could be the SVNIC private IP address, or the optional SVNIC public IP address, according to the customer's configuration. To do this, the customer will have to call CreateKubeConfig file on the migrated cluster, to get a kubeconfig 165 that has all the endpoints and manually select the SVNIC server out of it. The load balancer public IP may be listed first, so the customer may also have to specify the server to be the SVNIC IP after they've updated the kubeconfig 165. If they don't update that, they won't actually be exercising the new network path and could mask network issues until the reclamation workflow comes along later and removes the load balancer. Even if there aren't network issues, if the customer doesn't specify the SVNIC as the server, they could experience interruption when the load balancer is deleted.

By default, the customer will have a predetermined number of days (e.g., 30 days) to make this transition. After this grace period has expired, the control plane 115 will attempt to reclaim the load balancer 140 and its associated public IP address. The customer will also have the ability to file a ticket to request an extension to their grace period. A second attribute of the cluster called reclamationExtension will be used for an override of the migration completion and grace period calculation. To grant the customer an extension, an operator would need to update that value to a new date indicating when the grace period will expire. This field can also be used to decrease the grace period by setting it to a value less than the migration completion date and default grace period.

A nanny workflow will be responsible for scanning clusters to find one with a V2MigrationComplete timestamp that is set, and whose value is more than the predetermined number of day (e.g., 30*days) in the past, and don't have a reclamationExtension timestamp set to a future date. Clusters meeting these criteria will have reclamation workflows created for them. The reclamation workflow will make a call to MAPI to fetch the labels for the worker nodes 130 in the cluster. It will check to make sure that none of the worker nodes 130 have a 'needs-migration' label with a value that indicates that the proxymux migration was not complete. If the workflow cannot progress due to this condition, it will update the reclamationExtension timestamp attribute for the cluster by adding an additional predetermined number of days (e.g., 10*days), and the workflow will fail. This will give an opportunity to contact the customer to let them know that their migration has not completed successfully. The work of the reclamation workflow will be to update the clusterState to remove the load balancer's 140 IP address from the list of endpoints, wait for that to be reconciled, then delete the DNS record associated with the load balancer if it exists (some legacy V1 clusters may have had DNS records created automatically for the load balancer public ip), and finally to delete the load balancer 140 itself.

Techniques For Migrating or Updating Cluster Components

FIGS. 2-5 illustrate processes and operations for making eventual consistency cache updates deterministic. Individual embodiments may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The processes and/or operations depicted in FIGS. 2-5 may be implemented in software (e.g., code, instructions, program) executed by one or more processing units (e.g., processors cores), hardware, or combinations thereof. The software may be stored in a memory (e.g., on a memory device, on a non-transitory computer-readable storage medium). The particular series of processing steps in FIGS. 2-5 is not intended to be limiting. Other sequences of steps may also be performed according to alternative embodiments. For example, in alternative embodiments the steps outlined above may be performed in a different order. Moreover, the individual steps illustrated in FIGS. 2-5 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 2:
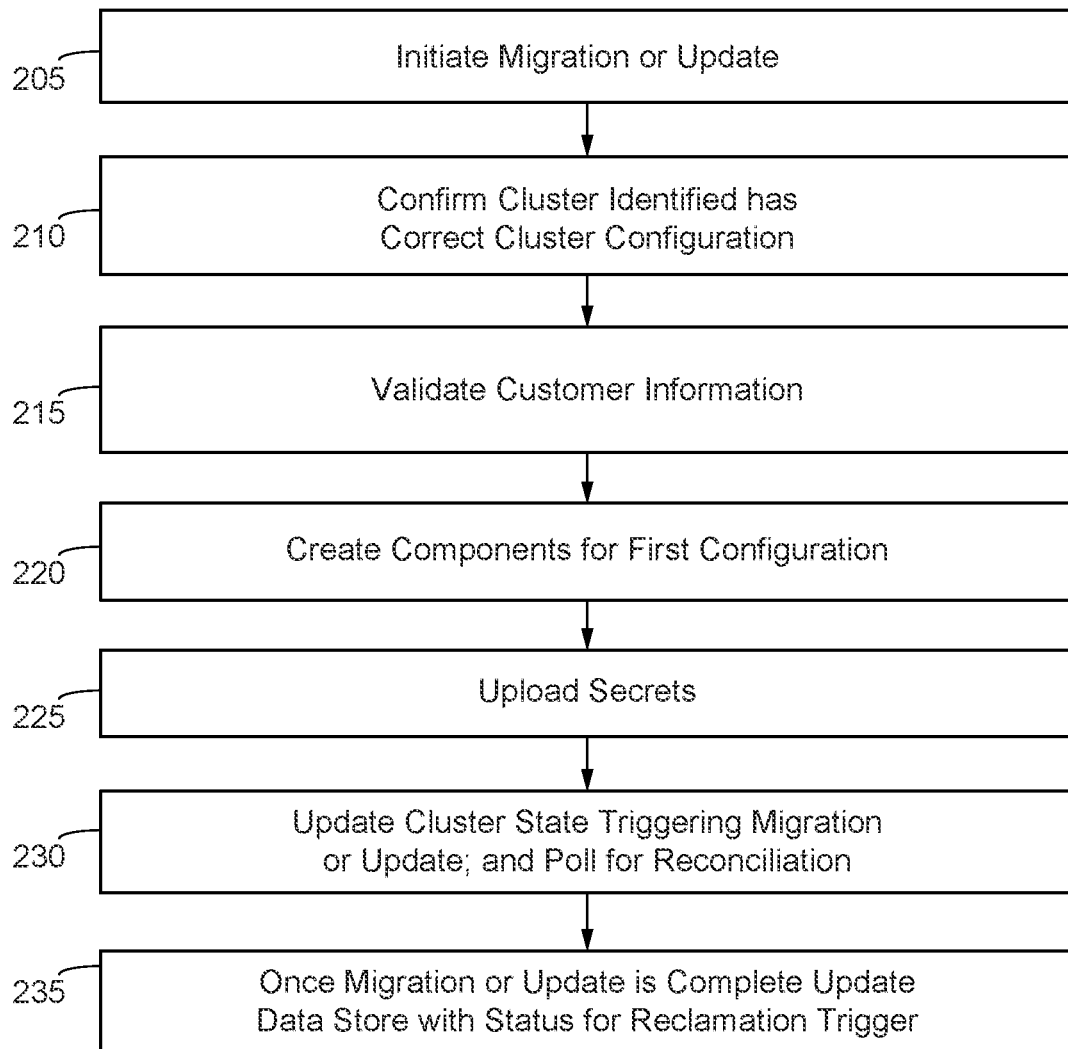
FIG. 2 is a flow diagram illustrating a workflow by the control plane for a migration or update of clusters from a first type of cluster configuration to a second type of cluster configuration according to various embodiments.

FIG. 2 shows a flowchart 200 that illustrates a workflow by the control plane for a migration or update of clusters from a first type of cluster configuration to a second type of cluster configuration. The processes depicted in the flowchart 200 may be implemented by the architecture, systems, and techniques depicted in FIGS. 1 and 6-10. At step 205, the migration or update of clusters from a first type of cluster configuration to a second type of cluster configuration is initiated. The process may be initiated by a customer submitting a request with customer information for migration or update of clusters from a first type of cluster configuration to a second type of cluster configuration. The migration or update may be defined by the service provide, the customer, or a combination thereof. In some instances, the migration or update comprises removing current component(s) of the first type of cluster configuration (also referred to herein as old components or first version components (V1)), adding updated component(s) of the second type of cluster configuration (also referred to herein as new components or second version components (V2)), changing paths of communication or networking (e.g., changing IP addresses), or any combination thereof. At step 210, check to see if a cluster identified by the request has a first type of cluster configuration. If it does not, end process or start workflow for migrating or updating a different type of cluster configuration. At step 215, the customer information in the request is validated. The customer information may include the ID of the customer's subnet where the updated component(s) of the second type of cluster configuration should be attached.

At step 220, the one or more updated components (e.g., a SVNIC) of the second type of cluster configuration are created. In some instances, the one or more updated components are created with a private IP address. The creating may include waiting for the component to come online and demonstrate connectivity, for example, via the private IP address. Optionally, the one or more components are created with a public IP address. The creating may include waiting for the one or more updated components to come online and demonstrate connectivity, for example, via the private and/or the public IP address. The creating may further include adding attachments for the one or more updated components (with private and/or public IP addresses), and waiting for the attachments to come online and demonstrate connectivity, for example, via the private and/or the public IP address. At step 225, secrets (e.g., Secrets in Vault—SiV) are uploaded. In various instances, prior to this point at step 220, failure cases will rollback the migration or update. Subsequent to this point at step 220, failure cases will result in the cluster being stuck in migration or updating, and no rollback is possible.

At step 230, the cluster state is updated in the MAPI. In some instances, the update includes the IP address(es) of the newly created one or more updated components (e.g., SVNIC) as well as the IP address(es) of one or more current or previous version components being replaced (e.g., load balancers). This step triggers the certificate generation (e.g., KMI/proxymux certificates) by the management plane and causes the manager instances (e.g., KMI) to stop using the one or more current or previous version components being replaced for cloud service connectivity such as OCI Service connectivity. Once updated, the control plane waits for the management plane to complete its workflow (see FIG. 3). While waiting, the control plane may poll for reconciliation. For example, changes to and by the container tool on worker nodes of a cluster (e.g., a DaemonSet referred to herein as a proxymux created automatically by the OKE on worker nodes during deployment) can take several hours. Therefore, the control plane may using polling and 'needs-migration' labels outside of this workflow to determine progress/success of the migration or update within the cluster. At step 235, once the migration or update for the cluster is completed or successful, a database or data table (e.g., kiev) may be updated. For example, a timestamp in a database or data table maybe updated to the current time/date, to indicate that the migration or update is completed or successful for the cluster and the reclamation scheduler may create a workflow for the cluster in the future (see FIG. 5).

Figure 3:
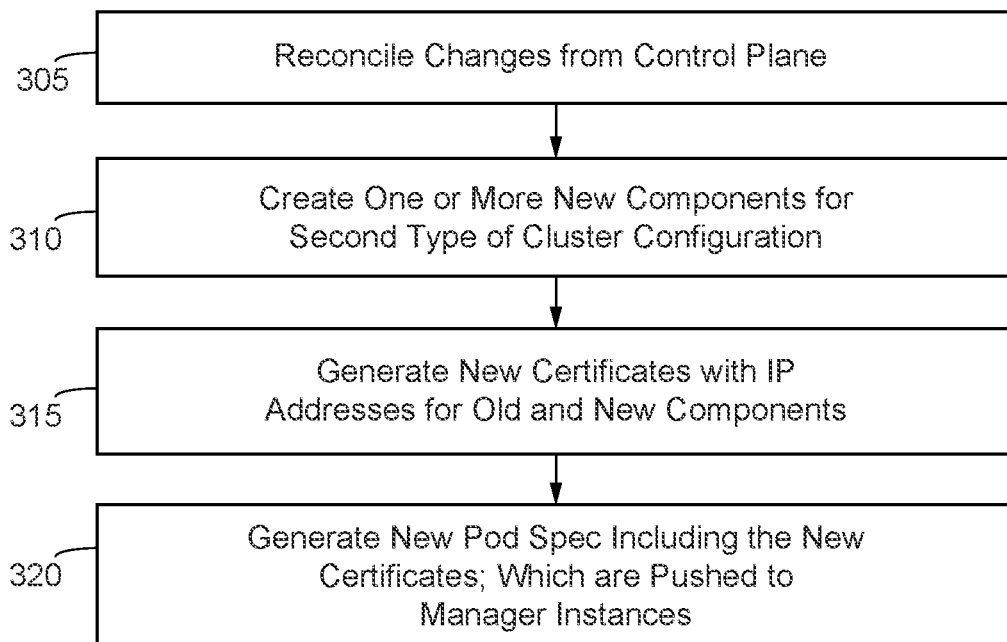
FIG. 3 is a flow diagram illustrating a workflow by the management plane for a migration or update of clusters from a first type of cluster configuration to a second type of cluster configuration according to various embodiments.

FIG. 3 shows a flowchart 300 that illustrates a workflow of the management plane for a migration or update of clusters from a first type of cluster configuration to a second type of cluster configuration. The processes depicted in the flowchart 300 may be implemented by the architecture, systems, and techniques depicted in FIGS. 1 and 6-10. At step 305, the changes from the control plane (e.g., the changes in IP addresses and components) are reconciled. In other words, this step initiates the processes to make the changes instructed by the control plane to migrate or update the clusters from the first type of cluster configuration to the second type of cluster configuration. At step 310, one or more additional components (e.g., a new muNIC associated to the new SVNIC) for the second type of cluster configuration are created. In some instances, the one or more additional components are created with a private IP address. The creating may include waiting for the component to come online and demonstrate connectivity, for example, via the private IP address. The creating may further include adding attachments for the one or more additional components (with private IP addresses), and waiting for the attachments to come online and demonstrate connectivity, for example, via the private IP address.

At step 315, new certificates are generated for the manager instances that include the IP address(es) for the one or more current or previous version components (e.g., load balancer) to be removed from the cluster configuration and the IP address(es) for the one or more new components (e.g., SVNIC) to be added to the cluster configuration. This allows for the cluster to continue to reach the API server (e.g., Kubernetes API server—kube-api-server) using either the old or the new addresses. The API server validates and configures data for the API objects which include pods, services, replication controllers, and others. The API server services REST operations and provides the frontend to the cluster's shared state through which all other components interact. At step 320, new pod specifications are generated comprising the new certificates, and the new pod specifications are pushed to the manager instances advertising the new IP address(es), which causes the API server to restart with the new advertised IP address(es).

Figure 4:
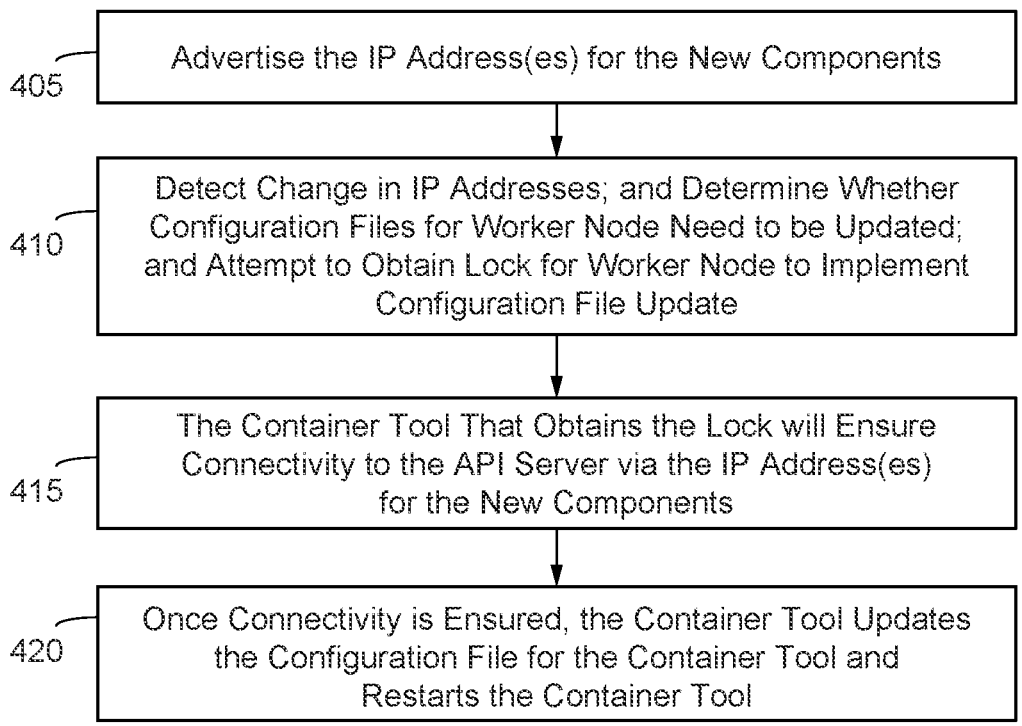
FIG. 4 is a flow diagram illustrating a workflow by the container tool for a migration or update of clusters from a first type of cluster configuration to a second type of cluster configuration according to various embodiments.

FIG. 4 shows a flowchart 400 that illustrates a workflow of the worker nodes (specifically the container tool such as proxymux on each worker node) for a migration or update of clusters from a first type of cluster configuration to a second type of cluster configuration. The processes depicted in the flowchart 400 may be implemented by the architecture, systems, and techniques depicted in FIGS. 1 and 6-10. At step 405, API servers will be restarted with the advertised IP address(es) set to the new IP address(es) for the one or more new components (e.g., SVNIC) to be added to the cluster configuration (e.g., kube-api-server—advertise-address) causing the IP address of the worker node cluster service (e.g., kubernetes.default service) to change. Each cluster is provisioned with a cluster service that provides a way for internal applications to talk to the API server. Essentially, the cluster service can be used to easily expose an application deployed on a set of pods using a single endpoint. At step 410, the container tool such as proxymux each worker node will detect the change in IP address and determine if the configuration files for the cluster (e.g., the kubeconfig and proxymux config) need to be updated. A file that is used to configure access to a cluster is sometimes called a kubeconfig file. This is a generic way of referring to configuration files. A file that is used to configure the container tool is sometimes called a proxymux config file. When the container tool determines the configuration files of the worker node need to be updated, each container tool will attempt to obtain a locking mechanism such as configmap lock to lock the respective worker node for the configuration update. Configmap is an API object used to store non-confidential data in key-value pairs. Pods can consume configmaps as environment variables, command-line arguments, or as configuration files in a volume. The locking mechanism is only obtainable by one container tool at a time thus ensuring only one worker node at a time is being updated. If the container tool is unable to acquire the configmap lock, either due to a network connectivity issue, or due to another node owning the locking mechanism, it will retry with backoff (i.e., waits for an amount of time before attempting to retransmit).

At step 415, the container tool that has the configmap lock will ensure connectivity (e.g., TCP connectivity) to API server via the advertised address (e.g., the component private IP address). In the event that the container tool is not able to verify the connectivity to the new IP address, the container tool will retry with backoff, so that once the network configuration is resolved, the container tool can resume migration. In order for the container tool to be able to make in-cluster calls, it will use a service account with a rolebinding created by the management plane. Once connectivity is ensured to the API server, at step 420 the container tool updates the container tool configuration files and restarts the container tool. The container tool will also update the server address in other configuration files such as kubeconfig and restart the node agent (e.g., kubelet that runs on each worker node). The node agent can register the worker node with the API server. In some instances, the container tool will also clear the 'needs-migration' label from the worker node. In additional or alternative instances, the container tool will generate and communicate a metric to the management plane showing the worker node has been migrated.

Figure 5:
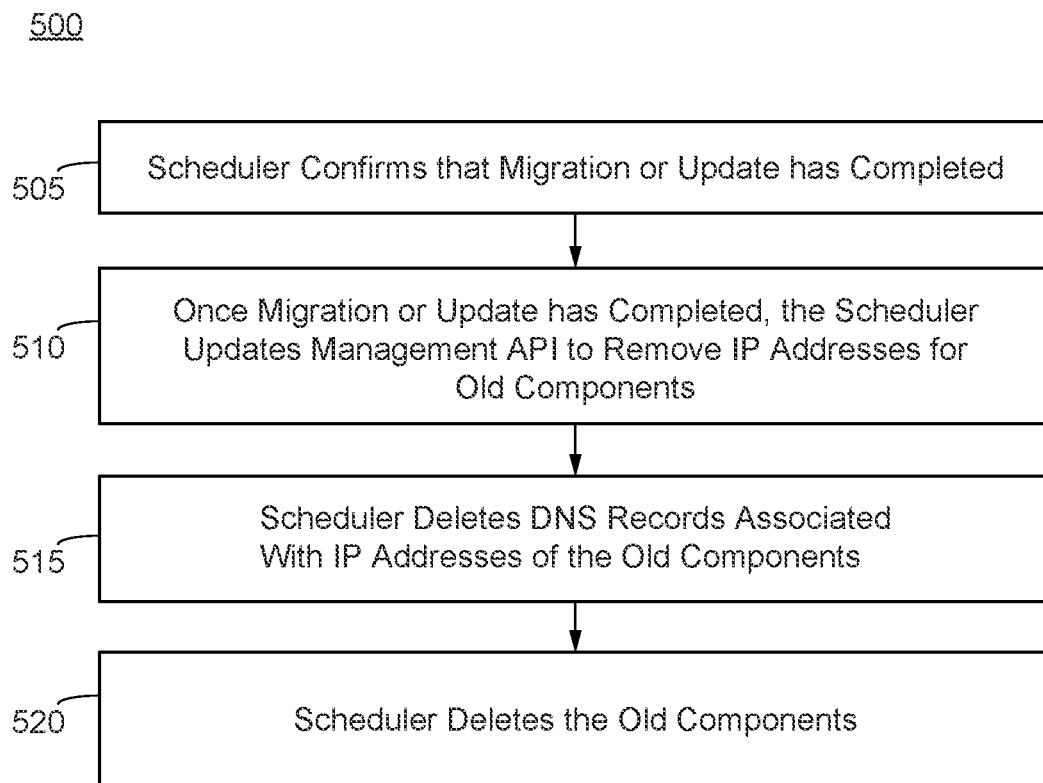
FIG. 5 is a flow diagram illustrating a workflow by the scheduler for a migration or update of clusters from a first type of cluster configuration to a second type of cluster configuration according to various embodiments.

FIG. 5 shows a flowchart 500 that illustrates a workflow of the reclamation scheduler nanny for a migration or update of clusters from a first type of cluster configuration to a second type of cluster configuration. The processes depicted in the flowchart 500 may be implemented by the architecture, systems, and techniques depicted in FIGS. 1 and 6-10. The reclamation scheduler nanny provides the ability to schedule reclamations for clusters that have exceeded their grace period, while also providing the ability to tune how many reclamation workflows are outstanding at any given time. The nanny schedules according to the order of the V2MigrationComplete or reclamationExtension time (if it is set), and does not take into account previous reclamation workflow failures for a cluster. Scheduling is based on the V2MigrationComplete timestamp. When this value is set, and is set to more than a certain number of days in the past, the cluster may be eligible for reclamation. The number of days past, referred to as the reclamation grace period is defaulted to a predetermined number of days (e.g., 30 days), but will be stored in storage device (e.g., Spectre) so that it is configurable and overridable. Each cluster will also have a field called reclamationExtension. This field will normally be unset, but a customer can request an extension to their reclamation grace period by filing a ticket. If the request is granted, the reclamationExtension timestamp will be set as an override to the (e.g., V2MigrationComplete+30*days) requirement. The reclamationExtension will mark the last day of the extension directly, not n–30 days, since the 30 is variable. The reclamationExtension can be set to a date less than (V2MigrationComplete+30*days) for customers that don't want to wait the full grace period for the reclamation to occur. The customer can file a ticket to request an extension to their grace period. This request can be satisfied by having an operator update the timestamp value of reclamationExtension on the cluster.

Part of the reclamation workflow will check to see if any of the nodes still have the 'needs-migration' label. If there are none, the reclamation will proceed. If some or all of the nodes still have that label, operations fall into the section of the workflow called 'Maximum Reclamation Grace Period'. At step 505, the scheduler confirms proxymux migration has completed by checking the worker nodes in the cluster for the 'needs-migration' label. Once the scheduler confirms proxymux migration has completed for all worker nodes on the cluster, at step 510 the scheduler updates MAPI to remove the IP address(es) for the one or more current or previous version components (e.g., load balancer) from the endpoint. The scheduler may then wait for the management plane to reconcile the update of the MAPI. Once reconciled, at step 515 the scheduler will delete the DNS record (if one exists) associated with the IP address(es) for the one or more current or previous version components (e.g., load balancer). At step 520, the scheduler will delete the one or more current or previous version components from the cluster configuration.

If any step after step 505 fails, the workflow will stop without rolling back and the workflow will be marked failed. This will allow the reclamation workflow to be rescheduled, and tried again automatically. For this reason, all steps must be tolerant of attempting to delete resources that have already been deleted. If the reclamation workflow fails because of the 'needs-migration' label check, it will set the reclamationExtension to a date in the future. How far into the future will be configured as a storage device (e.g., Spectre) value whose default is a predetermined number of days (e.g., 10 days). This will prevent the same cluster from getting scheduled over and over. The workflow failure will trigger an alarm that will give the service provider the opportunity to reach out to the customer to notify them that their network configuration is incorrect and their migration did not complete.

For most cases, reclamation will not proceed on a cluster where one or more nodes still have the 'needs-migration' label set. However, there is a need to decide how to handle clusters that have been in this state for a very long time, and for clusters where the majority of nodes have migrated successfully. This is known as Maximum Reclamation Grace Period. Having two fields, the V2MigrationComplete timestamp and the reclamationExtension timestamp will allow the service provider to define a policy of maximum amount of extensions.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 6:
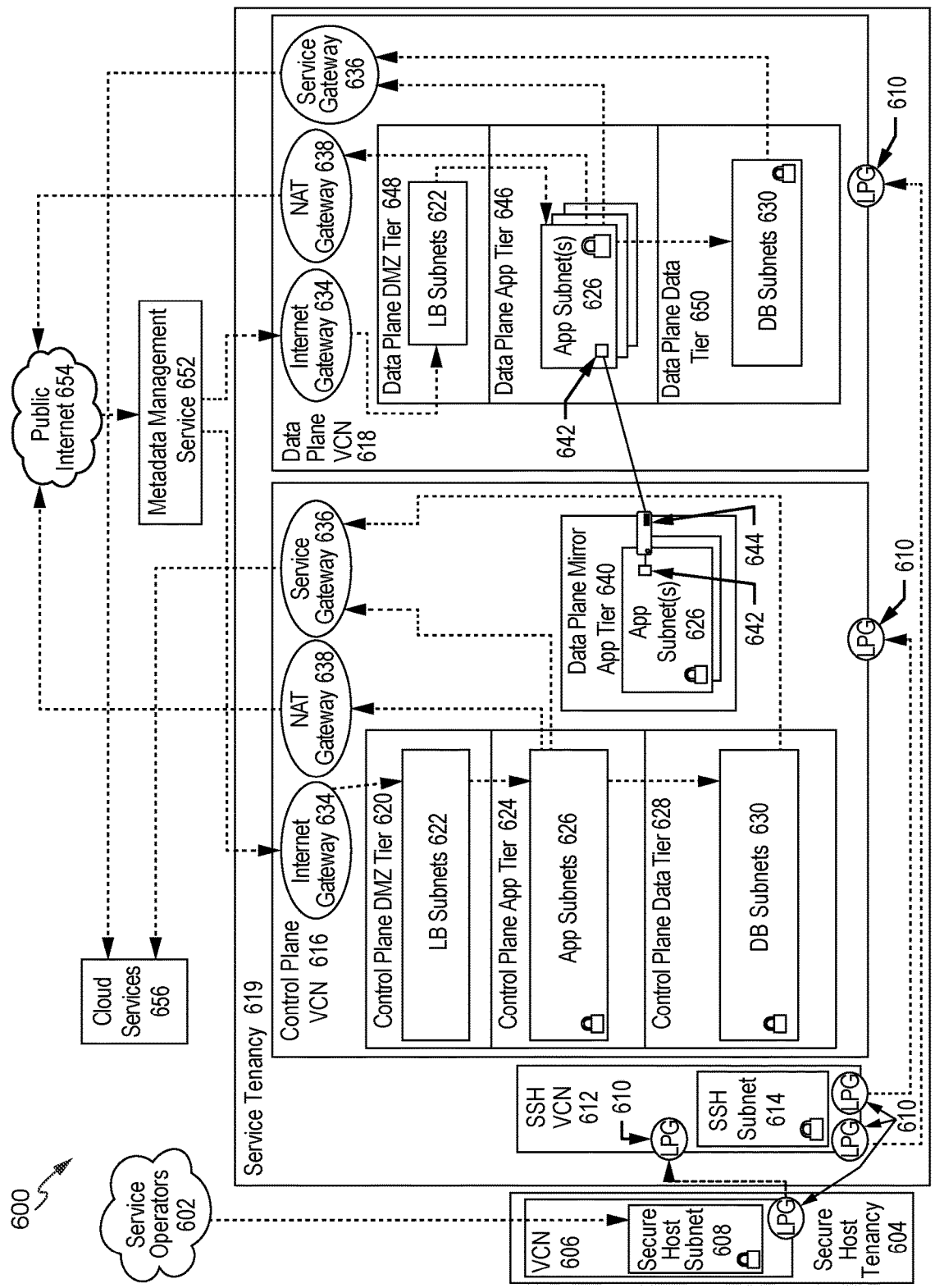
FIG. 6 is a block diagram illustrating one pattern for implementing a cloud infrastructure as a service system, according to at least one embodiment.

FIG. 6 is a block diagram 600 illustrating an example pattern of an IaaS architecture, according to at least one embodiment. Service operators 602 can be communicatively coupled to a secure host tenancy 604 that can include a virtual cloud network (VCN) 606 and a secure host subnet 608. In some examples, the service operators 602 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 606 and/or the Internet.

The VCN 606 can include a local peering gateway (LPG) 610 that can be communicatively coupled to a secure shell (SSH) VCN 612 via an LPG 610 contained in the SSH VCN 612. The SSH VCN 612 can include an SSH subnet 614, and the SSH VCN 612 can be communicatively coupled to a control plane VCN 616 via the LPG 610 contained in the control plane VCN 616. Also, the SSH VCN 612 can be communicatively coupled to a data plane VCN 618 via an LPG 610. The control plane VCN 616 and the data plane VCN 618 can be contained in a service tenancy 619 that can be owned and/or operated by the IaaS provider.

The control plane VCN 616 can include a control plane demilitarized zone (DMZ) tier 620 that acts as a perimeter network (e.g., portions of a corporate network between the corporate intranet and external networks). The DMZ-based servers may have restricted responsibilities and help keep breaches contained. Additionally, the DMZ tier 620 can include one or more load balancer (LB) subnet(s) 622, a control plane app tier 624 that can include app subnet(s) 626, a control plane data tier 628 that can include database (DB) subnet(s) 630 (e.g., frontend DB subnet(s) and/or backend DB subnet(s)). The LB subnet(s) 622 contained in the control plane DMZ tier 620 can be communicatively coupled to the app subnet(s) 626 contained in the control plane app tier 624 and an Internet gateway 634 that can be contained in the control plane VCN 616, and the app subnet(s) 626 can be communicatively coupled to the DB subnet(s) 630 contained in the control plane data tier 628 and a service gateway 636 and a network address translation (NAT) gateway 638. The control plane VCN 616 can include the service gateway 636 and the NAT gateway 638.

The control plane VCN 616 can include a data plane mirror app tier 640 that can include app subnet(s) 626. The app subnet(s) 626 contained in the data plane mirror app tier 640 can include a virtual network interface controller (VNIC) 642 that can execute a compute instance 644. The compute instance 644 can communicatively couple the app subnet(s) 626 of the data plane mirror app tier 640 to app subnet(s) 626 that can be contained in a data plane app tier 646.

The data plane VCN 618 can include the data plane app tier 646, a data plane DMZ tier 648, and a data plane data tier 650. The data plane DMZ tier 648 can include LB subnet(s) 622 that can be communicatively coupled to the app subnet(s) 626 of the data plane app tier 646 and the Internet gateway 634 of the data plane VCN 618. The app subnet(s) 626 can be communicatively coupled to the service gateway 636 of the data plane VCN 618 and the NAT gateway 638 of the data plane VCN 618. The data plane data tier 650 can also include the DB subnet(s) 630 that can be communicatively coupled to the app subnet(s) 626 of the data plane app tier 646.

The Internet gateway 634 of the control plane VCN 616 and of the data plane VCN 618 can be communicatively coupled to a metadata management service 652 that can be communicatively coupled to public Internet 654. Public Internet 654 can be communicatively coupled to the NAT gateway 638 of the control plane VCN 616 and of the data plane VCN 618. The service gateway 636 of the control plane VCN 616 and of the data plane VCN 618 can be communicatively couple to cloud services 656.

In some examples, the service gateway 636 of the control plane VCN 616 or of the data plane VCN 618 can make application programming interface (API) calls to cloud services 656 without going through public Internet 654. The API calls to cloud services 656 from the service gateway 636 can be one-way: the service gateway 636 can make API calls to cloud services 656, and cloud services 656 can send requested data to the service gateway 636. But, cloud services 656 may not initiate API calls to the service gateway 636.

In some examples, the secure host tenancy 604 can be directly connected to the service tenancy 619, which may be otherwise isolated. The secure host subnet 608 can communicate with the SSH subnet 614 through an LPG 610 that may enable two-way communication over an otherwise isolated system. Connecting the secure host subnet 608 to the SSH subnet 614 may give the secure host subnet 608 access to other entities within the service tenancy 619.

The control plane VCN 616 may allow users of the service tenancy 619 to set up or otherwise provision desired resources. Desired resources provisioned in the control plane VCN 616 may be deployed or otherwise used in the data plane VCN 618. In some examples, the control plane VCN 616 can be isolated from the data plane VCN 618, and the data plane mirror app tier 640 of the control plane VCN 616 can communicate with the data plane app tier 646 of the data plane VCN 618 via VNICs 642 that can be contained in the data plane mirror app tier 640 and the data plane app tier 646.

In some examples, users of the system, or customers, can make requests, for example create, read, update, or delete (CRUD) operations, through public Internet 654 that can communicate the requests to the metadata management service 652. The metadata management service 652 can communicate the request to the control plane VCN 616 through the Internet gateway 634. The request can be received by the LB subnet(s) 622 contained in the control plane DMZ tier 620. The LB subnet(s) 622 may determine that the request is valid, and in response to this determination, the LB subnet(s) 622 can transmit the request to app subnet(s) 626 contained in the control plane app tier 624. If the request is validated and requires a call to public Internet 654, the call to public Internet 654 may be transmitted to the NAT gateway 638 that can make the call to public Internet 654. Memory that may be desired to be stored by the request can be stored in the DB subnet(s) 630.

In some examples, the data plane mirror app tier 640 can facilitate direct communication between the control plane VCN 616 and the data plane VCN 618. For example, changes, updates, or other suitable modifications to configuration may be desired to be applied to the resources contained in the data plane VCN 618. Via a VNIC 642, the control plane VCN 616 can directly communicate with, and can thereby execute the changes, updates, or other suitable modifications to configuration to, resources contained in the data plane VCN 618.

In some embodiments, the control plane VCN 616 and the data plane VCN 618 can be contained in the service tenancy 619. In this case, the user, or the customer, of the system may not own or operate either the control plane VCN 616 or the data plane VCN 618. Instead, the IaaS provider may own or operate the control plane VCN 616 and the data plane VCN 618, both of which may be contained in the service tenancy 619. This embodiment can enable isolation of networks that may prevent users or customers from interacting with other users', or other customers', resources. Also, this embodiment may allow users or customers of the system to store databases privately without needing to rely on public Internet 654, which may not have a desired level of threat prevention, for storage.

In other embodiments, the LB subnet(s) 622 contained in the control plane VCN 616 can be configured to receive a signal from the service gateway 636. In this embodiment, the control plane VCN 616 and the data plane VCN 618 may be configured to be called by a customer of the IaaS provider without calling public Internet 654. Customers of the IaaS provider may desire this embodiment since database(s) that the customers use may be controlled by the IaaS provider and may be stored on the service tenancy 619, which may be isolated from public Internet 654.

Figure 7:
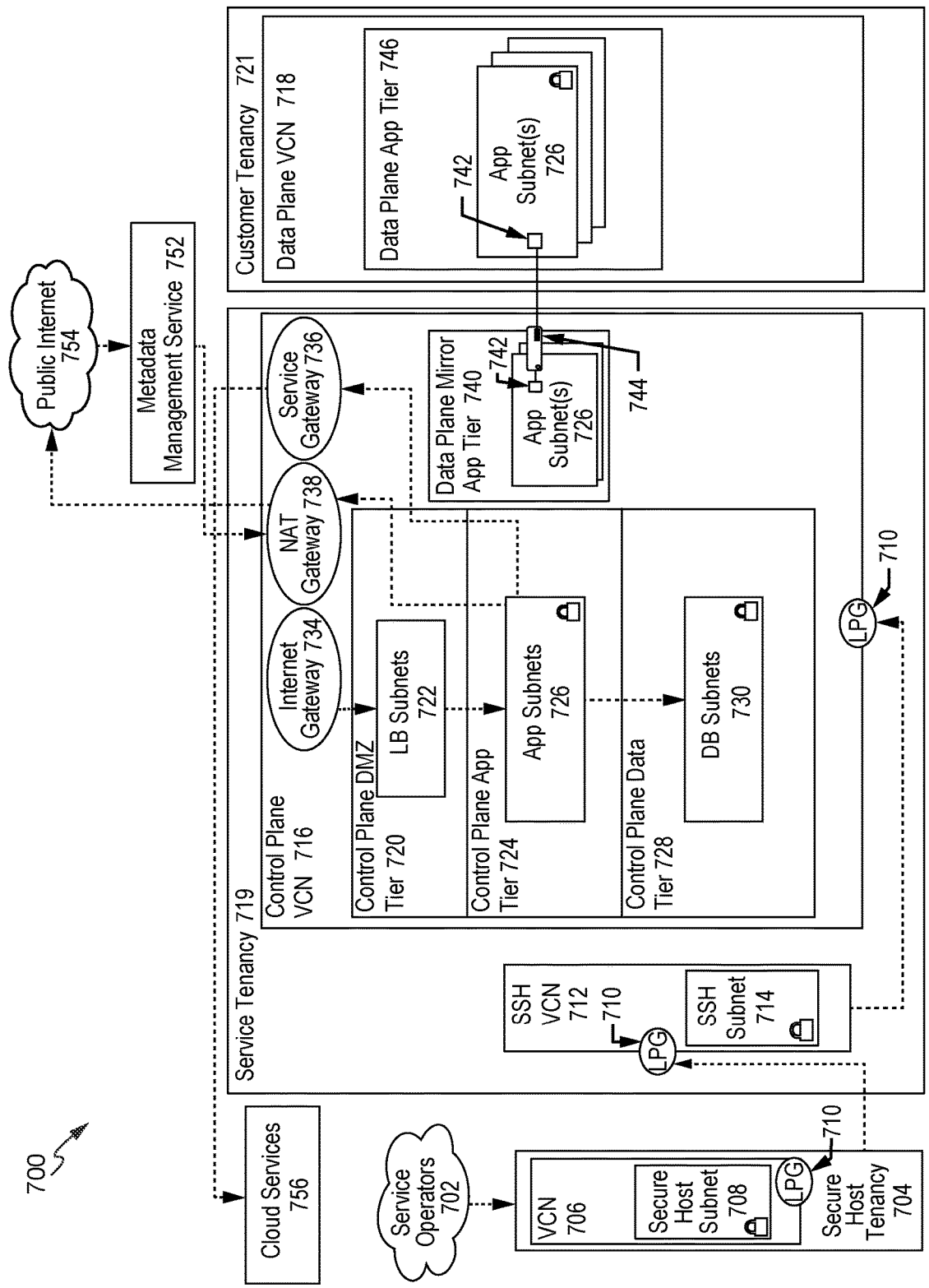
FIG. 7 is a block diagram illustrating another pattern for implementing a cloud infrastructure as a service system, according to at least one embodiment.

FIG. 7 is a block diagram 700 illustrating another example pattern of an IaaS architecture, according to at least one embodiment. Service operators 702 (e.g. service operators 602 of FIG. 6) can be communicatively coupled to a secure host tenancy 704 (e.g. the secure host tenancy 604 of FIG. 6) that can include a virtual cloud network (VCN) 706 (e.g. the VCN 606 of FIG. 6) and a secure host subnet 708 (e.g. the secure host subnet 608 of FIG. 6). The VCN 706 can include a local peering gateway (LPG) 710 (e.g. the LPG 610 of FIG. 6) that can be communicatively coupled to a secure shell (SSH) VCN 712 (e.g. the SSH VCN 612 of FIG. 6) via an LPG 610 contained in the SSH VCN 712. The SSH VCN 712 can include an SSH subnet 714 (e.g. the SSH subnet 614 of FIG. 6), and the SSH VCN 712 can be communicatively coupled to a control plane VCN 716 (e.g. the control plane VCN 616 of FIG. 6) via an LPG 710 contained in the control plane VCN 716. The control plane VCN 716 can be contained in a service tenancy 719 (e.g. the service tenancy 619 of FIG. 6), and the data plane VCN 718 (e.g. the data plane VCN 618 of FIG. 6) can be contained in a customer tenancy 721 that may be owned or operated by users, or customers, of the system.

The control plane VCN 716 can include a control plane DMZ tier 720 (e.g. the control plane DMZ tier 620 of FIG. 6) that can include LB subnet(s) 722 (e.g. LB subnet(s) 622 of FIG. 6), a control plane app tier 724 (e.g. the control plane app tier 624 of FIG. 6) that can include app subnet(s) 726 (e.g. app subnet(s) 626 of FIG. 6), a control plane data tier 728 (e.g. the control plane data tier 628 of FIG. 6) that can include database (DB) subnet(s) 730 (e.g. similar to DB subnet(s) 630 of FIG. 6). The LB subnet(s) 722 contained in the control plane DMZ tier 720 can be communicatively coupled to the app subnet(s) 726 contained in the control plane app tier 724 and an Internet gateway 734 (e.g. the Internet gateway 634 of FIG. 6) that can be contained in the control plane VCN 716, and the app subnet(s) 726 can be communicatively coupled to the DB subnet(s) 730 contained in the control plane data tier 728 and a service gateway 736 (e.g. the service gateway of FIG. 6) and a network address translation (NAT) gateway 738 (e.g. the NAT gateway 638 of FIG. 6). The control plane VCN 716 can include the service gateway 736 and the NAT gateway 738.

The control plane VCN 716 can include a data plane mirror app tier 740 (e.g. the data plane mirror app tier 640 of FIG. 6) that can include app subnet(s) 726. The app subnet(s) 726 contained in the data plane mirror app tier 740 can include a virtual network interface controller (VNIC) 742 (e.g. the VNIC of 642) that can execute a compute instance 744 (e.g. similar to the compute instance 644 of FIG. 6). The compute instance 744 can facilitate communication between the app subnet(s) 726 of the data plane mirror app tier 740 and the app subnet(s) 726 that can be contained in a data plane app tier 746 (e.g. the data plane app tier 646 of FIG. 6) via the VNIC 742 contained in the data plane mirror app tier 740 and the VNIC 742 contained in the data plane app tier 746.

The Internet gateway 734 contained in the control plane VCN 716 can be communicatively coupled to a metadata management service 752 (e.g. the metadata management service 652 of FIG. 6) that can be communicatively coupled to public Internet 754 (e.g. public Internet 654 of FIG. 6). Public Internet 754 can be communicatively coupled to the NAT gateway 738 contained in the control plane VCN 716. The service gateway 736 contained in the control plane VCN 716 can be communicatively couple to cloud services 756 (e.g. cloud services 656 of FIG. 6).

In some examples, the data plane VCN 718 can be contained in the customer tenancy 721. In this case, the IaaS provider may provide the control plane VCN 716 for each customer, and the IaaS provider may, for each customer, set up a unique compute instance 744 that is contained in the service tenancy 719. Each compute instance 744 may allow communication between the control plane VCN 716, contained in the service tenancy 719, and the data plane VCN 718 that is contained in the customer tenancy 721. The compute instance 744 may allow resources, that are provisioned in the control plane VCN 716 that is contained in the service tenancy 719, to be deployed or otherwise used in the data plane VCN 718 that is contained in the customer tenancy 721.

In other examples, the customer of the IaaS provider may have databases that live in the customer tenancy 721. In this example, the control plane VCN 716 can include the data plane mirror app tier 740 that can include app subnet(s) 726. The data plane mirror app tier 740 can reside in the data plane VCN 718, but the data plane mirror app tier 740 may not live in the data plane VCN 718. That is, the data plane mirror app tier 740 may have access to the customer tenancy 721, but the data plane mirror app tier 740 may not exist in the data plane VCN 718 or be owned or operated by the customer of the IaaS provider. The data plane mirror app tier 740 may be configured to make calls to the data plane VCN 718 but may not be configured to make calls to any entity contained in the control plane VCN 716. The customer may desire to deploy or otherwise use resources in the data plane VCN 718 that are provisioned in the control plane VCN 716, and the data plane mirror app tier 740 can facilitate the desired deployment, or other usage of resources, of the customer.

In some embodiments, the customer of the IaaS provider can apply filters to the data plane VCN 718. In this embodiment, the customer can determine what the data plane VCN 718 can access, and the customer may restrict access to public Internet 754 from the data plane VCN 718. The IaaS provider may not be able to apply filters or otherwise control access of the data plane VCN 718 to any outside networks or databases. Applying filters and controls by the customer onto the data plane VCN 718, contained in the customer tenancy 721, can help isolate the data plane VCN 718 from other customers and from public Internet 754.

In some embodiments, cloud services 756 can be called by the service gateway 736 to access services that may not exist on public Internet 754, on the control plane VCN 716, or on the data plane VCN 718. The connection between cloud services 756 and the control plane VCN 716 or the data plane VCN 718 may not be live or continuous. Cloud services 756 may exist on a different network owned or operated by the IaaS provider. Cloud services 756 may be configured to receive calls from the service gateway 736 and may be configured to not receive calls from public Internet 754. Some cloud services 756 may be isolated from other cloud services 756, and the control plane VCN 716 may be isolated from cloud services 756 that may not be in the same region as the control plane VCN 716. For example, the control plane VCN 716 may be located in "Region 1," and cloud service "Deployment 6," may be located in Region 1 and in "Region 2." If a call to Deployment 6 is made by the service gateway 736 contained in the control plane VCN 716 located in Region 1, the call may be transmitted to Deployment 6 in Region 1. In this example, the control plane VCN 716, or Deployment 6 in Region 1, may not be communicatively coupled to, or otherwise in communication with, Deployment 6 in Region 2.

Figure 8:
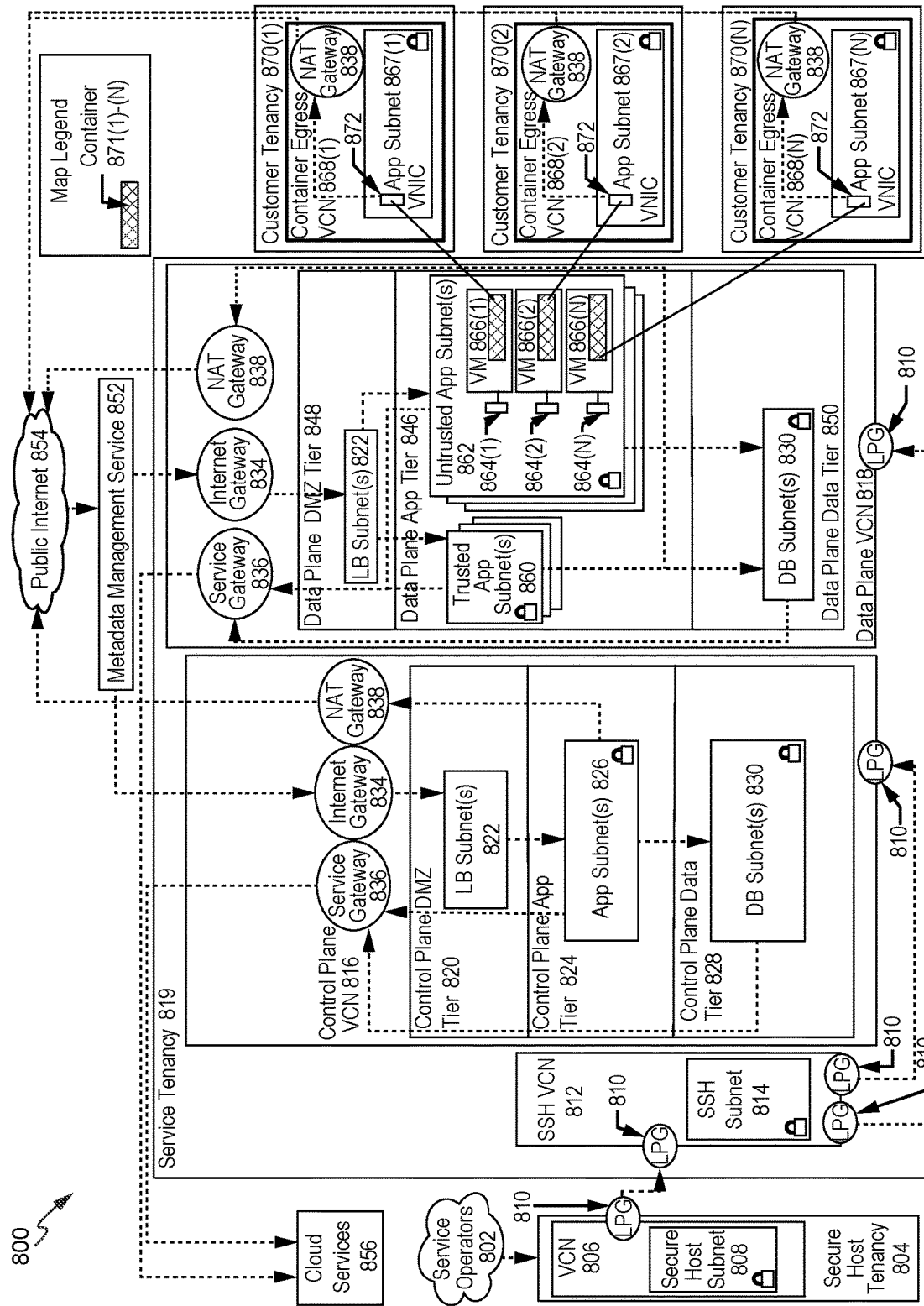
FIG. 8 is a block diagram illustrating another pattern for implementing a cloud infrastructure as a service system, according to at least one embodiment.

FIG. 8 is a block diagram 800 illustrating another example pattern of an IaaS architecture, according to at least one embodiment. Service operators 802 (e.g. service operators 602 of FIG. 6) can be communicatively coupled to a secure host tenancy 804 (e.g. the secure host tenancy 604 of FIG. 6) that can include a virtual cloud network (VCN) 806 (e.g. the VCN 606 of FIG. 6) and a secure host subnet 808 (e.g. the secure host subnet 608 of FIG. 6). The VCN 806 can include an LPG 810 (e.g. the LPG 610 of FIG. 6) that can be communicatively coupled to an SSH VCN 812 (e.g. the SSH VCN 612 of FIG. 6) via an LPG 810 contained in the SSH VCN 812. The SSH VCN 812 can include an SSH subnet 814 (e.g. the SSH subnet 614 of FIG. 6), and the SSH VCN 812 can be communicatively coupled to a control plane VCN 816 (e.g. the control plane VCN 616 of FIG. 6) via an LPG 810 contained in the control plane VCN 816 and to a data plane VCN 818 (e.g. the data plane 618 of FIG. 6) via an LPG 810 contained in the data plane VCN 818. The control plane VCN 816 and the data plane VCN 818 can be contained in a service tenancy 819 (e.g. the service tenancy 619 of FIG. 6).

The control plane VCN 816 can include a control plane DMZ tier 820 (e.g. the control plane DMZ tier 620 of FIG. 6) that can include load balancer (LB) subnet(s) 822 (e.g. LB subnet(s) 622 of FIG. 6), a control plane app tier 824 (e.g. the control plane app tier 624 of FIG. 6) that can include app subnet(s) 826 (e.g. similar to app subnet(s) 626 of FIG. 6), a control plane data tier 828 (e.g. the control plane data tier 628 of FIG. 6) that can include DB subnet(s) 830. The LB subnet(s) 822 contained in the control plane DMZ tier 820 can be communicatively coupled to the app subnet(s) 826 contained in the control plane app tier 824 and to an Internet gateway 834 (e.g. the Internet gateway 634 of FIG. 6) that can be contained in the control plane VCN 816, and the app subnet(s) 826 can be communicatively coupled to the DB subnet(s) 830 contained in the control plane data tier 828 and to a service gateway 836 (e.g. the service gateway of FIG. 6) and a network address translation (NAT) gateway 838 (e.g. the NAT gateway 638 of FIG. 6). The control plane VCN 816 can include the service gateway 836 and the NAT gateway 838.

The data plane VCN 818 can include a data plane app tier 846 (e.g. the data plane app tier 646 of FIG. 6), a data plane DMZ tier 848 (e.g. the data plane DMZ tier 648 of FIG. 6), and a data plane data tier 850 (e.g. the data plane data tier 650 of FIG. 6). The data plane DMZ tier 848 can include LB subnet(s) 822 that can be communicatively coupled to trusted app subnet(s) 860 and untrusted app subnet(s) 862 of the data plane app tier 846 and the Internet gateway 834 contained in the data plane VCN 818. The trusted app subnet(s) 860 can be communicatively coupled to the service gateway 836 contained in the data plane VCN 818, the NAT gateway 838 contained in the data plane VCN 818, and DB subnet(s) 830 contained in the data plane data tier 850. The untrusted app subnet(s) 862 can be communicatively coupled to the service gateway 836 contained in the data plane VCN 818 and DB subnet(s) 830 contained in the data plane data tier 850. The data plane data tier 850 can include DB subnet(s) 830 that can be communicatively coupled to the service gateway 836 contained in the data plane VCN 818.

The untrusted app subnet(s) 862 can include one or more primary VNICs 864(1)-(N) that can be communicatively coupled to tenant virtual machines (VMs) 866(1)-(N). Each tenant VM 866(1)-(N) can be communicatively coupled to a respective app subnet 867(1)-(N) that can be contained in respective container egress VCNs 868(1)-(N) that can be contained in respective customer tenancies 870(1)-(N). Respective secondary VNICs 872(1)-(N) can facilitate communication between the untrusted app subnet(s) 862 contained in the data plane VCN 818 and the app subnet contained in the container egress VCNs 868(1)-(N). Each container egress VCNs 868(1)-(N) can include a NAT gateway 838 that can be communicatively coupled to public Internet 854 (e.g. public Internet 654 of FIG. 6).

The Internet gateway 834 contained in the control plane VCN 816 and contained in the data plane VCN 818 can be communicatively coupled to a metadata management service 852 (e.g. the metadata management system 652 of FIG. 6) that can be communicatively coupled to public Internet 854. Public Internet 854 can be communicatively coupled to the NAT gateway 838 contained in the control plane VCN 816 and contained in the data plane VCN 818. The service gateway 836 contained in the control plane VCN 816 and contained in the data plane VCN 818 can be communicatively couple to cloud services 856.

In some embodiments, the data plane VCN 818 can be integrated with customer tenancies 870. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 846. Code to run the function may be executed in the VMs 866(1)-(N), and the code may not be configured to run anywhere else on the data plane VCN 818. Each VM 866(1)-(N) may be connected to one customer tenancy 870. Respective containers 871(1)-(N) contained in the VMs 866(1)-(N) may be configured to run the code. In this case, there can be a dual isolation (e.g., the containers 871(1)-(N) running code, where the containers 871(1)-(N) may be contained in at least the VM 866(1)-(N) that are contained in the untrusted app subnet(s) 862), which may help prevent incorrect or otherwise undesirable code from damaging the network of the IaaS provider or from damaging a network of a different customer. The containers 871(1)-(N) may be communicatively coupled to the customer tenancy 870 and may be configured to transmit or receive data from the customer tenancy 870. The containers 871(1)-(N) may not be configured to transmit or receive data from any other entity in the data plane VCN 818. Upon completion of running the code, the IaaS provider may kill or otherwise dispose of the containers 871(1)-(N).

In some embodiments, the trusted app subnet(s) 860 may run code that may be owned or operated by the IaaS provider. In this embodiment, the trusted app subnet(s) 860 may be communicatively coupled to the DB subnet(s) 830 and be configured to execute CRUD operations in the DB subnet(s) 830. The untrusted app subnet(s) 862 may be communicatively coupled to the DB subnet(s) 830, but in this embodiment, the untrusted app subnet(s) may be configured to execute read operations in the DB subnet(s) 830. The containers 871(1)-(N) that can be contained in the VM 866(1)-(N) of each customer and that may run code from the customer may not be communicatively coupled with the DB subnet(s) 830.

In other embodiments, the control plane VCN 816 and the data plane VCN 818 may not be directly communicatively coupled. In this embodiment, there may be no direct communication between the control plane VCN 816 and the data plane VCN 818. However, communication can occur indirectly through at least one method. An LPG 810 may be established by the IaaS provider that can facilitate communication between the control plane VCN 816 and the data plane VCN 818. In another example, the control plane VCN 816 or the data plane VCN 818 can make a call to cloud services 856 via the service gateway 836. For example, a call to cloud services 856 from the control plane VCN 816 can include a request for a service that can communicate with the data plane VCN 818.

Figure 9:
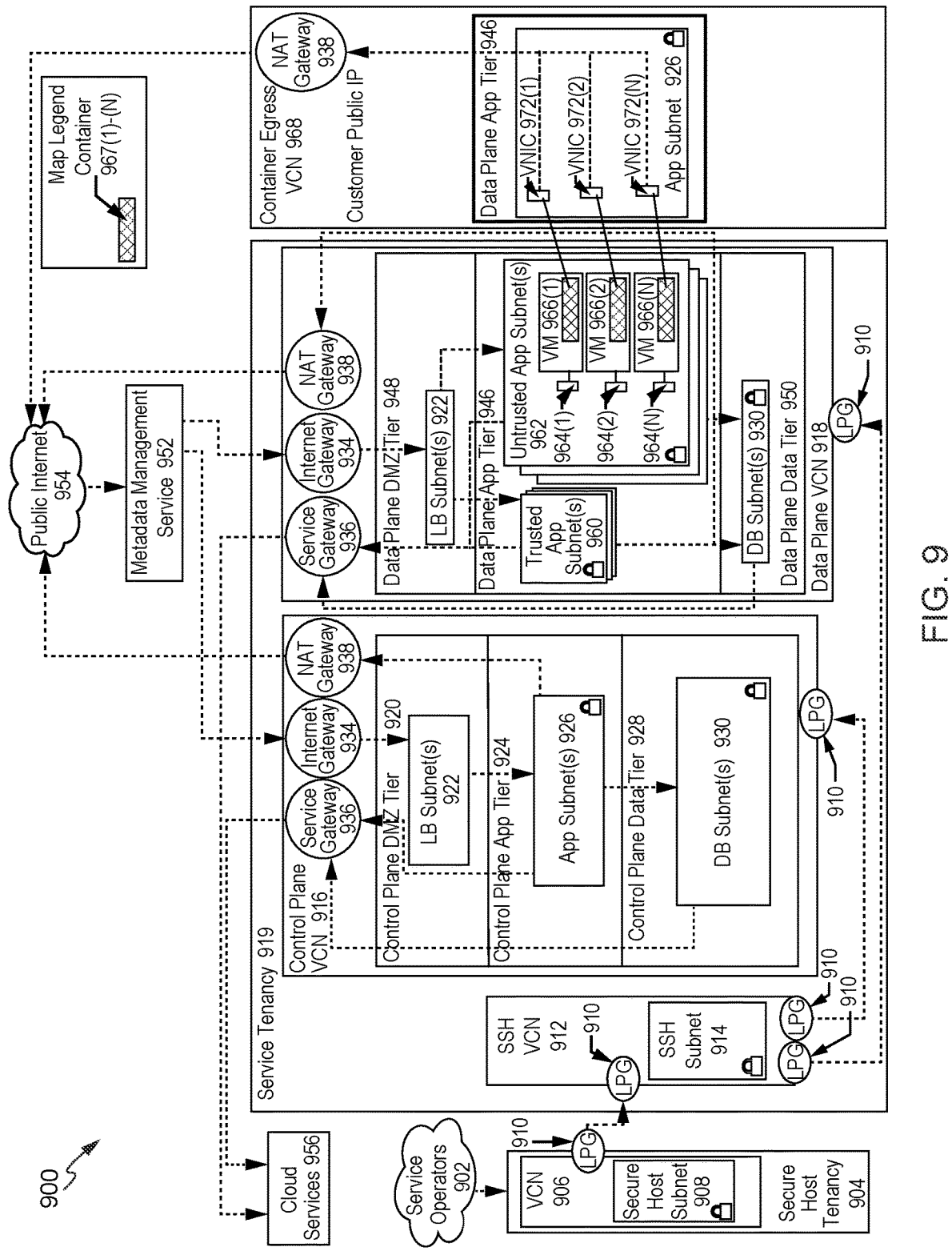
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g. service operators 602 of FIG. 6) can be communicatively coupled to a secure host tenancy 904 (e.g. the secure host tenancy 604 of FIG. 6) that can include a virtual cloud network (VCN) 906 (e.g. the VCN 606 of FIG. 6) and a secure host subnet 908 (e.g. the secure host subnet 608 of FIG. 6). The VCN 906 can include an LPG 910 (e.g. the LPG 610 of FIG. 6) that can be communicatively coupled to an SSH VCN 912 (e.g. the SSH VCN 612 of FIG. 6) via an LPG 910 contained in the SSH VCN 912. The SSH VCN 912 can include an SSH subnet 914 (e.g. the SSH subnet 614 of FIG. 6), and the SSH VCN 912 can be communicatively coupled to a control plane VCN 916 (e.g. the control plane VCN 616 of FIG. 6) via an LPG 910 contained in the control plane VCN 916 and to a data plane VCN 918 (e.g. the data plane 618 of FIG. 6) via an LPG 910 contained in the data plane VCN 918. The control plane VCN 916 and the data plane VCN 918 can be contained in a service tenancy 919 (e.g. the service tenancy 619 of FIG. 6).

The control plane VCN 916 can include a control plane DMZ tier 920 (e.g. the control plane DMZ tier 620 of FIG. 6) that can include LB subnet(s) 922 (e.g. LB subnet(s) 622 of FIG. 6), a control plane app tier 924 (e.g. the control plane app tier 624 of FIG. 6) that can include app subnet(s) 926 (e.g. app subnet(s) 626 of FIG. 6), a control plane data tier 928 (e.g. the control plane data tier 628 of FIG. 6) that can include DB subnet(s) 930 (e.g. DB subnet(s) 830 of FIG. 8). The LB subnet(s) 922 contained in the control plane DMZ tier 920 can be communicatively coupled to the app subnet(s) 926 contained in the control plane app tier 924 and to an Internet gateway 934 (e.g. the Internet gateway 634 of FIG. 6) that can be contained in the control plane VCN 916, and the app subnet(s) 926 can be communicatively coupled to the DB subnet(s) 930 contained in the control plane data tier 928 and to a service gateway 936 (e.g. the service gateway of FIG. 6) and a network address translation (NAT) gateway 938 (e.g. the NAT gateway 638 of FIG. 6). The control plane VCN 916 can include the service gateway 936 and the NAT gateway 938.

The data plane VCN 918 can include a data plane app tier 946 (e.g. the data plane app tier 646 of FIG. 6), a data plane DMZ tier 948 (e.g. the data plane DMZ tier 648 of FIG. 6), and a data plane data tier 950 (e.g. the data plane data tier 650 of FIG. 6). The data plane DMZ tier 948 can include LB subnet(s) 922 that can be communicatively coupled to trusted app subnet(s) 960 (e.g. trusted app subnet(s) 860 of FIG. 8) and untrusted app subnet(s) 962 (e.g. untrusted app subnet(s) 862 of FIG. 8) of the data plane app tier 946 and the Internet gateway 934 contained in the data plane VCN 918. The trusted app subnet(s) 960 can be communicatively coupled to the service gateway 936 contained in the data plane VCN 918, the NAT gateway 938 contained in the data plane VCN 918, and DB subnet(s) 930 contained in the data plane data tier 950. The untrusted app subnet(s) 962 can be communicatively coupled to the service gateway 936 contained in the data plane VCN 918 and DB subnet(s) 930 contained in the data plane data tier 950. The data plane data tier 950 can include DB subnet(s) 930 that can be communicatively coupled to the service gateway 936 contained in the data plane VCN 918.

The untrusted app subnet(s) 962 can include primary VNICs 964(1)-(N) that can be communicatively coupled to tenant virtual machines (VMs) 966(1)-(N) residing within the untrusted app subnet(s) 962. Each tenant VM 966(1)-(N) can run code in a respective container 967(1)-(N), and be communicatively coupled to an app subnet 926 that can be contained in a data plane app tier 946 that can be contained in a container egress VCN 968. Respective secondary VNICs 972(1)-(N) can facilitate communication between the untrusted app subnet(s) 962 contained in the data plane VCN 918 and the app subnet contained in the container egress VCN 968. The container egress VCN can include a NAT gateway 938 that can be communicatively coupled to public Internet 954 (e.g. public Internet 654 of FIG. 6).

The Internet gateway 934 contained in the control plane VCN 916 and contained in the data plane VCN 918 can be communicatively coupled to a metadata management service 952 (e.g. the metadata management system 652 of FIG. 6) that can be communicatively coupled to public Internet 954. Public Internet 954 can be communicatively coupled to the NAT gateway 938 contained in the control plane VCN 916 and contained in the data plane VCN 918. The service gateway 936 contained in the control plane VCN 916 and contained in the data plane VCN 918 can be communicatively couple to cloud services 956.

In some examples, the pattern illustrated by the architecture of block diagram 900 of FIG. 9 may be considered an exception to the pattern illustrated by the architecture of block diagram 800 of FIG. 8 and may be desirable for a customer of the IaaS provider if the IaaS provider cannot directly communicate with the customer (e.g., a disconnected region). The respective containers 967(1)-(N) that are contained in the VMs 966(1)-(N) for each customer can be accessed in real-time by the customer. The containers 967(1)-(N) may be configured to make calls to respective secondary VNICs 972(1)-(N) contained in app subnet(s) 926 of the data plane app tier 946 that can be contained in the container egress VCN 968. The secondary VNICs 972(1)-(N) can transmit the calls to the NAT gateway 938 that may transmit the calls to public Internet 954. In this example, the containers 967(1)-(N) that can be accessed in real-time by the customer can be isolated from the control plane VCN 916 and can be isolated from other entities contained in the data plane VCN 918. The containers 967(1)-(N) may also be isolated from resources from other customers.

In other examples, the customer can use the containers 967(1)-(N) to call cloud services 956. In this example, the customer may run code in the containers 967(1)-(N) that requests a service from cloud services 956. The containers 967(1)-(N) can transmit this request to the secondary VNICs 972(1)-(N) that can transmit the request to the NAT gateway that can transmit the request to public Internet 954. Public Internet 954 can transmit the request to LB subnet(s) 922 contained in the control plane VCN 916 via the Internet gateway 934. In response to determining the request is valid, the LB subnet(s) can transmit the request to app subnet(s) 926 that can transmit the request to cloud services 956 via the service gateway 936.

It should be appreciated that IaaS architectures 600, 700, 800, 900 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

FIG. 10 illustrates an example computer system 1000, in which various embodiments may be implemented. The system 1000 may be used to implement any of the computer systems described above. As shown in the figure, computer system 1000 includes a processing unit 1004 that communicates with a number of peripheral subsystems via a bus subsystem 1002. These peripheral subsystems may include a processing acceleration unit 1006, an I/O subsystem 1008, a storage subsystem 1018 and a communications subsystem 1024. Storage subsystem 1018 includes tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1004, which can be implemented as one or more integrated circuits (e.g., a conventional microprocessor or microcontroller), controls the operation of computer system 1000. One or more processors may be included in processing unit 1004. These processors may include single core or multicore processors. In certain embodiments, processing unit 1004 may be implemented as one or more independent processing units 1032 and/or 1034 with single or multicore processors included in each processing unit. In other embodiments, processing unit 1004 may also be implemented as a quad-core processing unit formed by integrating two dual-core processors into a single chip.

In various embodiments, processing unit 1004 can execute a variety of programs in response to program code and can maintain multiple concurrently executing programs or processes. At any given time, some or all of the program code to be executed can be resident in processor(s) 1004 and/or in storage subsystem 1018. Through suitable programming, processor(s) 1004 can provide various functionalities described above. Computer system 1000 may additionally include a processing acceleration unit 1006, which can include a digital signal processor (DSP), a special-purpose processor, and/or the like.

I/O subsystem 1008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1000 may comprise a storage subsystem 1018 that comprises software elements, shown as being currently located within a system memory 1010. System memory 1010 may store program instructions that are loadable and executable on processing unit 1004, as well as data generated during the execution of these programs.

Depending on the configuration and type of computer system 1000, system memory 1010 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1004. In some implementations, system memory 1010 may include multiple different types of memory, such as static random access memory (SRAM) or dynamic random access memory (DRAM). In some implementations, a basic input/output system (BIOS), containing the basic routines that help to transfer information between elements within computer system 1000, such as during start-up, may typically be stored in the ROM. By way of example, and not limitation, system memory 1010 also illustrates application programs 1012, which may include client applications, Web browsers, mid-tier applications, relational database management systems (RDBMS), etc., program data 1014, and an operating system 1016. By way of example, operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1018 may also provide a tangible computer-readable storage medium for storing the basic programming and data constructs that provide the functionality of some embodiments. Software (programs, code modules, instructions) that when executed by a processor provide the functionality described above may be stored in storage subsystem 1018. These software modules or instructions may be executed by processing unit 1004. Storage subsystem 1018 may also provide a repository for storing data used in accordance with the present disclosure.

Storage subsystem 1000 may also include a computer-readable storage media reader 1020 that can further be connected to computer-readable storage media 1022. Together and, optionally, in combination with system memory 1010, computer-readable storage media 1022 may comprehensively represent remote, local, fixed, and/or removable storage devices plus storage media for temporarily and/or more permanently containing, storing, transmitting, and retrieving computer-readable information.

Computer-readable storage media 1022 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1000.

By way of example, computer-readable storage media 1022 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1000.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to connect to one or more devices via the Internet. In some embodiments communications subsystem 1024 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

In some embodiments, communications subsystem 1024 may also receive input communication in the form of structured and/or unstructured data feeds 1026, event streams 1028, event updates 1030, and the like on behalf of one or more users who may use computer system 1000.

By way of example, communications subsystem 1024 may be configured to receive data feeds 1026 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1024 may also be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method comprising:
   restarting an application programming interface (API) server with advertised IP addresses set to new IP addresses of one or more new components to be added to a cluster configuration, wherein the restarting causes IP addresses of a worker node cluster service to change;
   detecting, by container tools associated with the worker node cluster service, the change in IP addresses;
   in response to detecting the change in IP addresses, determining, by each of the container tools, whether configuration files for worker nodes of one or more clusters of the cluster configuration need to be updated;
   in response to determining the configuration files need to be updated, attempting, by each container tool, to obtain a locking mechanism to lock respective worker nodes for updating the configuration files, wherein the locking mechanism is only obtainable by a single container tool at a time thus ensuring the configuration file of only one worker node at a time is being updated, wherein when a container tool is unable to acquire the locking mechanism, either due to a network connectivity issue or due to another container tool having the locking mechanism, the container tool will retry obtaining the locking mechanism with backoff, and wherein the container tool that has the locking mechanism will ensure connectivity to the API server via at least one of the advertised IP addresses; and once connectivity is ensured to the API server, updating, by the container tool having the locking mechanism, the configuration file of a respective worker node.

2. The method of claim 1, wherein the one or more clusters of the cluster configuration are provisioned with a cluster service that provides a way for an application deployed on a set of pods to talk to the API server using a single endpoint.

3. The method of claim 2, wherein the updating each of the worker nodes further comprises iteratively: updating, by the container tool having the locking mechanism, a configuration file of the container tool, restarting the container tool after updating the configuration file of the container tool and prior to updating the configuration file of the worker node, and clearing a 'needs-migration' label from the worker node after updating the configuration file of the worker node.

4. The method of claim 1, further comprising: updating, by the container tool, IP addresses in other configuration files with the new IP addresses of the one or more new components, and restarting, by the container tool, a node agent that can register the worker node with the APIs server.

5. The method of claim 4, further comprising: clearing a 'needs-migration' label from the worker node after updating the configuration file of the worker node.

6. The method of claim 1, wherein the one or more new components comprise a service or software defined virtual network interface card.

7. The method of claim 1, wherein the updating each of the worker nodes comprises iteratively: acquiring, by the container tool, the locking mechanism for a worker node, confirming, by the container tool, connectivity from the worker node to the one or more new components and the new IP addresses, updating, by the container tool, the configuration file of the worker node to point to the new IP addresses, and releasing, by the container tool, the locking mechanism.

8. A system comprising:
one or more data processors; and
a non-transitory computer readable storage medium containing instructions which, when executed on the one or more data processors, cause the one or more data processors to perform actions including:
restarting an application programming interface (API) server with advertised IP addresses set to new IP addresses of one or more new components to be added to a cluster configuration, wherein the restarting causes IP addresses of a worker node cluster service to change;
detecting, by container tools associated with the worker node cluster service, the change in IP addresses;
in response to detecting the change in IP addresses, determining, by each of the container tools, whether configuration files for worker nodes of one or more clusters of the cluster configuration need to be updated;
in response to determining the configuration files need to be updated, attempting, by each container tool, to obtain a locking mechanism to lock respective worker nodes for updating the configuration files, wherein the locking mechanism is only obtainable by a single container tool at a time thus ensuring the configuration file of only one worker node at a time is being updated, wherein when a container tool is unable to acquire the locking mechanism, either due to a network connectivity issue or due to another container tool having the locking mechanism, the container tool will retry obtaining the locking mechanism with backoff, and wherein the container tool that has the locking mechanism will ensure connectivity to the API server via at least one of the advertised IP addresses; and
once connectivity is ensured to the API server, updating, by the container tool having the locking mechanism, the configuration file of a respective worker node.

9. The system of claim 8, wherein the one or more clusters of the cluster configuration are provisioned with a cluster service that provides a way for an application deployed on a set of pods to talk to the API server using a single endpoint.

10. The system of claim 9, wherein the updating each of the worker nodes further comprises iteratively: updating, by the container tool having the locking mechanism, a configuration file of the container tool, restarting the container tool after updating the configuration file of the container tool and prior to updating the configuration file of the worker node, and clearing a 'needs-migration' label from the worker node after updating the configuration file of the worker node.

11. The system of claim 8, wherein the actions further include: updating, by the container tool, IP addresses in other configuration files with the new IP addresses of the one or more new components, and restarting, by the container tool, a node agent that can register the worker node with the APIs server.

12. The system of claim 11, wherein the actions further include: clearing a 'needs-migration' label from the worker node after updating the configuration file of the worker node.

13. The system of claim 8, wherein the one or more new components comprise a service or software defined virtual network interface card.

14. The system of claim 8, wherein the updating each of the worker nodes comprises iteratively: acquiring, by the container tool, the locking mechanism for a worker node, confirming, by the container tool, connectivity from the worker node to the one or more new components and the new IP addresses, updating, by the container tool, the configuration file of the worker node to point to the new IP addresses, and releasing, by the container tool, the locking mechanism.

15. A computer-program product tangibly embodied in a non-transitory machine-readable storage medium, including instructions configured to cause one or more data processors to perform actions including:
restarting an application programming interface (API) server with advertised IP addresses set to new IP addresses of one or more new components to be added to a cluster configuration, wherein the restarting causes IP addresses of a worker node cluster service to change;
detecting, by container tools associated with the worker node cluster service, the change in IP addresses;
in response to detecting the change in IP addresses, determining, by each of the container tools, whether configuration files for worker nodes of one or more clusters of the cluster configuration need to be updated;
in response to determining the configuration files need to be updated, attempting, by each container tool, to obtain a locking mechanism to lock respective worker nodes for updating the configuration files, wherein the locking mechanism is only obtainable by a single container tool at a time thus ensuring the configuration file of only one worker node at a time is being updated, wherein when a container tool is unable to acquire the locking mechanism, either due to a network connectivity issue or due to another container tool having the locking mechanism, the container tool will retry obtaining the locking mechanism with backoff, and wherein the container tool that has the locking mechanism will ensure connectivity to the API server via at least one of the advertised IP addresses; and once connectivity is ensured to the API server, updating, by the container tool having the locking mechanism, the configuration file of a respective worker node.

16. The computer-program product of claim 15, wherein the one or more clusters of the cluster configuration are provisioned with a cluster service that provides a way for an application deployed on a set of pods to talk to the API server using a single endpoint.

17. The computer-program product of claim 16, wherein the updating each of the worker nodes further comprises iteratively: updating, by the container tool having the locking mechanism, a configuration file of the container tool, restarting the container tool after updating the configuration file of the container tool and prior to updating the configuration file of the worker node, and clearing a 'needs-migration' label from the worker node after updating the configuration file of the worker node.

18. The computer-program product of claim 15, wherein the actions further include: updating, by the container tool, IP addresses in other configuration files with the new IP addresses of the one or more new components, and restarting, by the container tool, a node agent that can register the worker node with the APIs server.

19. The computer-program product of claim 18, wherein the actions further include: clearing a 'needs-migration' label from the worker node after updating the configuration file of the worker node.

20. The computer-program product of claim 15, wherein the updating each of the worker nodes comprises iteratively: acquiring, by the container tool, the locking mechanism for a worker node, confirming, by the container tool, connectivity from the worker node to the one or more new components and the new IP addresses, updating, by the container tool, the configuration file of the worker node to point to the new IP addresses, and releasing, by the container tool, the locking mechanism.

\* \* \* \* \*